United States Patent
Takahashi et al.

(10) Patent No.: US 7,622,086 B2
(45) Date of Patent: Nov. 24, 2009

(54) SELECTIVELY PERMEABLE MEMBRANE TYPE REACTOR

(75) Inventors: Akira Takahashi, Nagoya (JP); Nobuhiko Mori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 478 days.

(21) Appl. No.: 10/586,670

(22) PCT Filed: Jan. 17, 2005

(86) PCT No.: PCT/JP2005/000456

§ 371 (c)(1),
(2), (4) Date: Jul. 20, 2006

(87) PCT Pub. No.: WO2005/070519

PCT Pub. Date: Aug. 4, 2005

(65) Prior Publication Data

US 2007/0166206 A1 Jul. 19, 2007

(30) Foreign Application Priority Data

Jan. 26, 2004 (JP) .............................. 2004-017542

(51) Int. Cl.
*B01J 8/04* (2006.01)
*B01D 53/22* (2006.01)

(52) U.S. Cl. ........................ 422/190; 422/211; 422/213; 422/236; 422/238; 422/239; 96/4; 96/7; 96/144; 96/154

(58) Field of Classification Search .................. 422/190, 422/191, 211, 213, 236, 238, 239, 312; 96/4, 96/7, 144, 154
See application file for complete search history.

(56) References Cited

U.S. PATENT DOCUMENTS

| 5,221,484 | A | 6/1993 | Goldsmith et al. |
| 6,090,312 | A * | 7/2000 | Ziaka et al. ................. 252/373 |
| 6,228,147 | B1 * | 5/2001 | Takahashi ...................... 95/55 |
| 6,919,062 | B1 * | 7/2005 | Vasileiadis et al. ....... 423/437.1 |
| 7,419,648 | B2 * | 9/2008 | Kuipers et al. ............ 423/437.1 |
| 2003/0083534 | A1 * | 5/2003 | Gauthier et al. ............. 585/818 |
| 2003/0168407 | A1 * | 9/2003 | Kusakabe et al. ........... 210/650 |

FOREIGN PATENT DOCUMENTS

| DE | 103 54 415 A1 | 6/2005 |
| EP | 0 787 524 A1 | 8/1997 |
| GB | 2190397 | * 11/1987 |
| JP | 06-040703 | 2/1994 |
| JP | 06-321503 | 11/1994 |
| JP | 2000-327302 | 11/2000 |

(Continued)

*Primary Examiner*—N. Bhat
(74) *Attorney, Agent, or Firm*—Burr & Brown

(57) ABSTRACT

A selectively permeable membrane type reactor including a catalyst for promoting a chemical reaction, a selectively permeable membrane which selectively allows a specific component to pass therethrough, and a carrier for disposing the catalyst and the selectively permeable membrane the carrier being a tubular body having two or more gas passage cells partitioned and formed by a partition wall formed of a porous body, the catalyst being individually disposed in some of the cells of the carrier, the selectively permeable membrane being individually disposed in the remainder of the cells, and the cell in which the catalyst is disposed and the cell in which the selectively permeable membrane is disposed being adjacently disposed with the partition wall positioned therebetween.

11 Claims, 6 Drawing Sheets

FOREIGN PATENT DOCUMENTS

| | | |
|---|---|---|
| JP | 2001-213611 | 8/2001 |
| JP | 2001-348205 | 12/2001 |
| JP | 2003-346859 | 12/2003 |
| JP | 2005-058823 | 3/2005 |
| WO | 03/099424 A1 | 12/2003 |

* cited by examiner

SELECTIVELY PERMEABLE MEMBRANE TYPE REACTOR

The present application is based on International Application PCT/JP2005/000456, filed Jan. 17, 2005, which application is incorporated herein by reference in its entirety.

FIELD OF THE INVENTION

The present invention relates to a selectively permeable membrane type reactor which includes a catalyst for promoting a chemical reaction and a selectively permeable membrane which selectively allows a specific component to pass therethrough, and may be used for various applications such as separating/recovering a reaction product or improving reaction selectivity.

BACKGROUND OF THE INVENTION

A selectively permeable membrane type reactor (also called "membrane reactor"; see patent document 1) is a new concept reactor which includes a catalyst for promoting a chemical reaction and a selectively permeable membrane which selectively allows a specific component to pass therethrough to exhibit a catalytic effect and selective permeability. For example, a selectively permeable membrane type reactor called an extractor type reactor simultaneously effects a chemical reaction using the catalyst and separation/recovery of the reaction product using the selectively permeable membrane, and has been used for producing hydrogen by reforming a hydrocarbon and separating/recovering the produced hydrogen. In recent years, hydrogen has attracted attention as a clean energy source in the field of fuel cells and the like. Therefore, this type of reactor is expected to be increasingly used in the future.

As a known selectively permeable membrane type reactor, a selectively permeable membrane type reactor 10 shown in FIG. 1 has been widely used which has a double tube structure having a reaction tube 2 and a separation tube 4 with a bottom which is disposed inside the reaction tube 2 and formed of a porous body, in which a catalyst 6 for promoting a chemical reaction is disposed in the space between the reaction tube 2 and the separation tube 4, and a selectively permeable membrane 8 which selectively allows a specific component to pass therethrough is disposed on the outer surface of the separation tube 4.

The configurations of the catalyst and the selectively permeable membrane of the selectively permeable membrane type reactor 10 differ depending on the application (type of reaction). In an extractor type reactor used for producing hydrogen by reforming a hydrocarbon and separating/recovering the produced hydrogen, a nickel (Ni) or ruthenium (Ru) based reforming catalyst which promotes a reforming reaction of a hydrocarbon is provided as the catalyst 6, and a hydrogen permeable membrane formed of a palladium-silver (Pd—Ag) alloy and a ceramic porous body made of a silica ($SiO_2$) or zirconia ($ZrO_2$), which selectively allows hydrogen to pass therethrough, is provided as the selectively permeable membrane 8, for example.

According to the selectively permeable membrane type reactor 10, when a raw material gas $G_1$, such as a hydrocarbon (methane in this example) and steam, is introduced through a gas inlet 2a of the reaction tube 2 at a high temperature of about 300 to 1000° C., the raw material gas $G_1$ contacts the catalyst 6, whereby a reforming reaction shown by the following formula (1) and a shift reaction shown by the following formula (2) are promoted. This catalytic effect causes the hydrocarbon (methane) to be decomposed into reaction products such as hydrogen, carbon monoxide, and carbon dioxide, whereby a mixed gas (product gas) containing these reaction products is obtained.

$$CH_4+H_2O \leftrightarrows CO+3H_2 \qquad (1)$$

$$CO+H_2O \leftrightarrows CO_2+H_2 \qquad (2)$$

The hydrogen obtained as the product gas passes through the selectively permeable membrane 8 to enter the separation tube 4 formed of the porous body, and is separated/recovered as a permeable gas $G_2$ through an open end 4a of the separation tube 4. On the other hand, since the remaining components (e.g. carbon monoxide and carbon dioxide as the reaction products and unreacted raw material gas) cannot pass through the selectively permeable membrane 8, these components pass through the reaction tube 2 and are recovered as an impermeable gas $G_3$ through a gas recovery port 2b. This mechanism allows the permeable gas $G_2$ and the impermeable gas $G_3$ to be separated and individually recovered, whereby only the target component (hydrogen in this example) can be selectively separated/recovered from the reaction products of the reforming reaction.

Since the selectively permeable membrane type reactor can achieve catalytic reaction promotion and selective permeation of a specific component using the selectively permeable membrane by a series of operations in a single reactor, the selectively permeable membrane type reactor has a compact configuration and requires only a small installation area. Moreover, since part of the reaction products passes through the selectively permeable membrane and is removed from the reaction system, the chemical reaction equilibrium shifts toward the production side, whereby a reaction can take place at a low temperature. Therefore, consumption of energy supplied from the outside during the reaction can be reduced, and deterioration and corrosion of the reactor can be prevented. This makes it unnecessary to use an expensive heat-resistant/corrosion-resistant material as the material for the reactor, whereby the cost of the reactor can be reduced.

[Patent document 1] JP-A-6-40703

SUMMARY OF THE INVENTION

The selectively permeable membrane type reactor 10 having the structure shown in FIG. 1 can achieve catalytic reaction promotion and selective permeation of a specific component using the selectively permeable membrane, but requires a further improvement in efficiency. For example, the extractor type reactor can achieve production and separation/recovery of the target component, but does not necessarily exhibit a high production and separation/recovery efficiency. In order to improve the efficiency of reaction promotion and selective permeation, it is forced to increase the area of the selectively permeable membrane or carry out reaction at an elevated temperature. Specifically, the advantages of the selectively permeable membrane type reactor, such as compact configuration and allowing a reaction to take place at a low temperature, are reduced, whereby the selectively permeable membrane type reactor may not fully exert its effects.

As described above, a selectively permeable membrane type reactor which can achieve catalytic reaction promotion and selective permeation of a specific component using the selectively permeable membrane with a sufficiently high efficiency has not been disclosed. Therefore, provision of such a reactor has been demanded in the industry. The present invention was achieved to solve the above-described problems of the prior art technology, and provides a selectively permeable membrane type reactor which exerts advantageous effects in comparison with a known reactor by achieving a catalytic reaction and selective permeation of a specific component using the selectively permeable membrane with a sufficiently high efficiency.

The inventors of the present invention have conducted extensive studies to solve the above-described problems. As a result, the inventors have found that the structure employed in a known reactor, in which the catalyst and the selectively permeable membrane are disposed in the same space, reduces the efficiency of a catalytic reaction and selective permeation of a specific component using the selectively permeable membrane. The inventors have found that the above-described problems can be solved by a novel structure using a carrier having two or more gas passages (cells) partitioned and formed by a partition wall formed of a porous body, wherein the catalyst is disposed in some of the cells, the selectively permeable membrane is disposed in the remainder of the cells, and the cell (reaction cell) in which the catalyst is disposed and the cell (recovery cell) in which the selectively permeable membrane is disposed are adjacently disposed. This finding has led to the completion of the present invention. Specifically, the present invention provides the following selectively permeable membrane type reactor.

In a first embodiment of the invention, a selectively permeable membrane type reactor is provided, that includes a catalyst for promoting a chemical reaction, a selectively permeable membrane which selectively allows a specific component to pass therethrough, and a carrier for disposing the catalyst and the selectively permeable membrane, the carrier being a tubular body having two or more gas passages (cells) partitioned and formed by a partition wall formed of a porous body, the catalyst being independently disposed in some of the cells, the selectively permeable membrane being independently disposed in the remainder of the cells, and the cell (reaction cell) in which the catalyst is disposed and the cell recovery cell) in which the selectively permeable membrane is disposed being adjacently disposed.

The carrier preferably includes the cells partitioned and formed by the partition wall with a thickness of 10 μm to 3 cm.

The catalyst preferably is a pellet-shaped or bead-shaped catalyst, and is disposed in the carrier by filling the cell of the carrier with the pellet-shaped or bead-shaped catalyst in a packed bed manner.

The catalyst preferably is in the shape of a thin film and is disposed in the carrier by forming the catalyst in the shape of a thin film on a surface of the partition wall which partitions and forms the cells of the carrier.

The carrier preferably includes one center cell disposed to include a center axis of the carrier and two or more peripheral cells disposed adjacent to the center cell on a periphery of the center cell, the catalyst is disposed in either one of the center cell, or the peripheral cells, and the selectively permeable membrane is disposed in the another.

The carrier preferably is a tubular body with a square, rectangular, or regular hexagonal end face.

In another embodiment, the selectively permeable membrane type reactor includes a plurality of the selectively permeable membrane type reactors, where the selectively permeable membrane type reactors are integrated to form a composite reactor.

The selectively permeable membrane type reactor according to the present invention exerts advantageous effects in comparison with a known reactor by achieving a catalytic reaction and selective permeation of a specific component using the selectively permeable membrane with a sufficiently high efficiency.

EXPLANATION OF SYMBOLS

Figure 1:
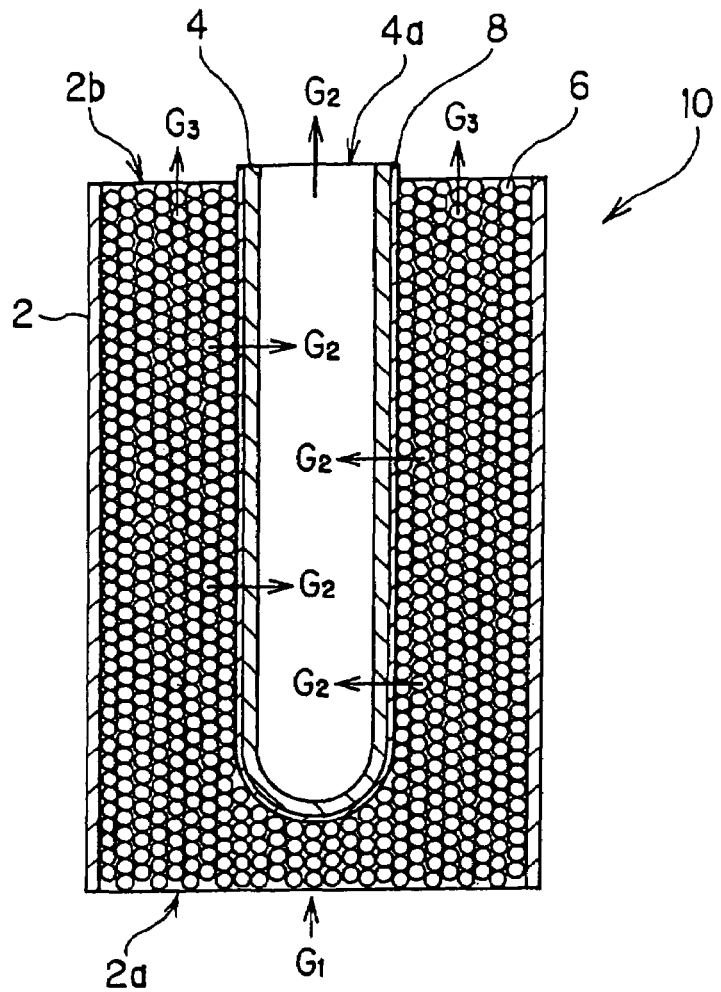
FIG. 1 is a schematic cross-sectional view showing one embodiment of a known selectively permeable membrane type reactor.

2: reaction tube, 2a: gas inlet, 2b: gas recovery port, 4: separation tube, 4a: open end, 6: catalyst, 8: selectively permeable membrane, 10, 20, 50, 70, 86: selectively permeable membrane type reactor, 22, 52: carrier, 24: partition wall, 26: cell, 28: center cell, 30, 32: peripheral cell, 34: plug, 38: recovery cell, 40, 42: reaction cell, 40a: gas inlet, 40b, 42b: gas recovery port, 60: composite reactor, 76: catalyst, 80: evaluation device, 82a, 82b, 82c, 82d: raw material gas supply source, 82e: hydrogen supply source, 84: vaporizer, 88: heater, 90: liquid trap, 92a, 92b: flowmeter, 94a, 94b: gas chromatograph, 96: permeable gas recovery line, 98: impermeable gas recovery line, 100: sweep gas supply line, $G_1$: raw material gas, $G_2$: permeable gas, $G_3$: impermeable gas, $G_4$: sweep gas

DETAILED DESCRIPTION OF THE INVENTION

During the development of the selectively permeable membrane type reactor according to the present invention, the inventors of the present invention have investigated the reasons why the efficiency of a catalytic reaction and selective permeation of a specific component using the selectively permeable membrane is reduced in a known selectively permeable membrane type reactor. As a result, the inventors have found that a known selectively permeable membrane type reactor has a structure similar to that of the selectively permeable membrane type reactor 10 shown in FIG. 1, in which the catalyst 6 and the selectively permeable membrane 8 are disposed in the same space which is a space between the reaction tube 2 and the separation tube 4, and that this structure reduces the efficiency of a catalytic reaction and selective permeation of a specific component using the selectively permeable membrane.

In more detail, in the selectively permeable membrane type reactor, a catalyst powder may be generated due to wear of the catalyst or the like when providing the catalyst or during use. When using a structure similar to that of the selectively permeable membrane type reactor 10 shown in FIG. 1 in which the catalyst 6 and the selectively permeable membrane 8 are disposed in the same space, it is difficult to prevent a phenomenon in which the catalyst powder adheres to the selectively permeable membrane 8 to clog the surface of the membrane or the catalyst powder reacts with the component of the selectively permeable membrane. The inventors have found that the above phenomenon causes deterioration of the selectively permeable membrane 8 and decreases the function of the selectively permeable membrane type reactor, thereby reducing the efficiency of a catalytic reaction and selective permeation of a specific component using the selectively permeable membrane.

Figure 2A:
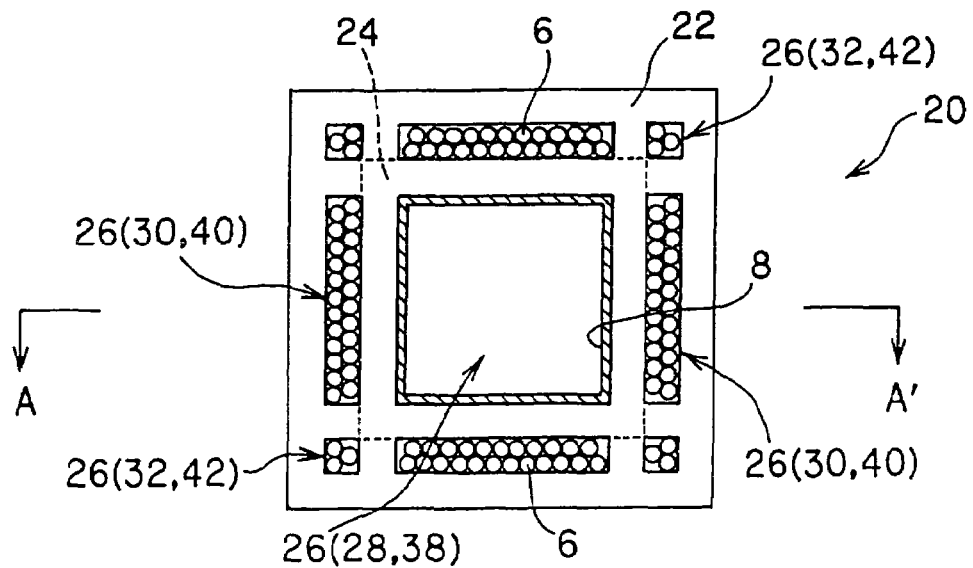
FIG. 2(a) is a schematic top view showing one embodiment of a selectively permeable membrane type reactor according to the present invention.
Figure 2B:
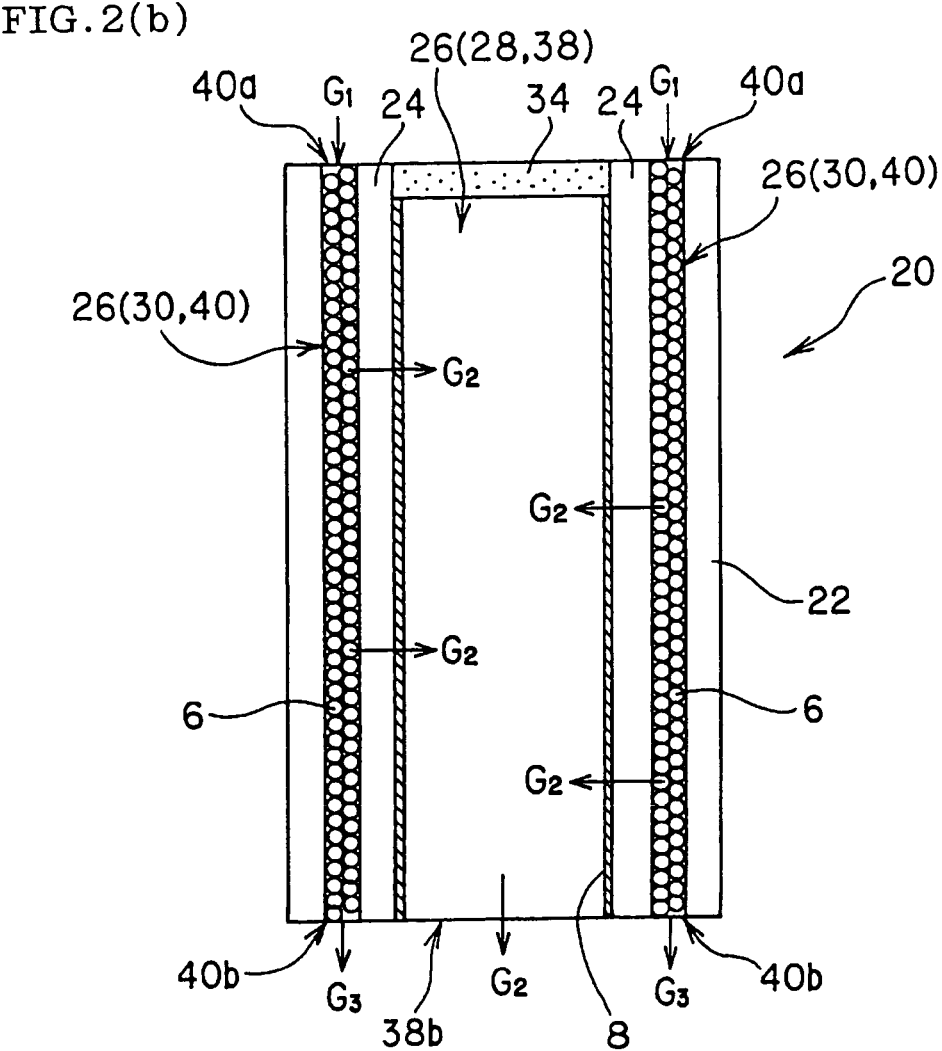
FIG. 2(b) is a cross-sectional view along the line A-A' shown in FIG. 2(a).

Therefore, as represented by a selectively permeable membrane type reactor 20 shown in FIGS. 2(a) and 2(b), the present invention employs a structure using a carrier 22 having two or more gas passages (cells 26) partitioned and formed by a partition wall 24 formed of a porous body, a catalyst 6 being disposed in some of the cells 26, a selectively permeable membrane 8 being disposed in the remainder of the cells 26, and the cell (reaction cells 40, 42) in which the catalyst 6 is disposed and the cell (recovery cell 38) in which the selectively permeable membrane 8 is disposed being adjacently disposed. According to this structure, even if a catalyst powder is produced due to wear of the catalyst 6 or the like, a phenomenon can be prevented in which the catalyst powder adheres to the selectively permeable membrane 8 to clog the surface of the membrane or the catalyst powder reacts with the component of the selectively permeable membrane. Therefore, deterioration of the selectively permeable membrane 8 and a decrease in the function of the selectively permeable membrane type reactor can be effectively prevented, whereby a catalytic reaction and selective permeation of a specific component using the selectively permeable membrane can be achieved with a sufficiently high efficiency.

A commonly used selectively permeable membrane type reactor is outlined before describing the selectively permeable membrane type reactor according to the present invention. A selectively permeable membrane type reactor is a reactor which includes a catalyst for promoting a chemical reaction and a selectively permeable membrane which selectively allows a specific component to pass therethrough to exhibit a catalytic effect and selective permeability. The selectively permeable membrane type reactor may be classified into the following three types depending on the function or the application.

(i) Extractor type reactor: the extractor type reactor simultaneously effects a chemical reaction using the catalyst and separation/recovery of the reaction product using the selectively permeable membrane. For example, an extractor type reactor including a hydrogen permeable membrane as the selectively permeable membrane has been used for producing hydrogen by reforming a hydrocarbon and separating/recovering the produced hydrogen.

(ii) Distributor type reactor: the distributor type reactor simultaneously effects a chemical reaction using the catalyst and prevention of a side reaction by concentration adjustment of a specific component using the selectively permeable membrane. For example, a distributor type reactor including an oxygen permeable membrane as the selectively permeable membrane has been used for an oxidation reaction of a hydrocarbon or the like. An oxidation reaction is desirably carried out at a low oxygen concentration in order to control the gas composition ratio outside the explosion range, reduce the partial pressure of oxygen to improve partial oxidation selectivity, and the like. Therefore, a method may be employed in which an oxidation reaction is carried out while removing oxygen from the reaction field using the oxygen permeable membrane.

(iii) Contactor type reactor: the contactor type reactor effects a chemical reaction using the selectively permeable membrane as the catalyst. The contactor type reactor is used to improve reaction selectivity by supplying active species effective for the reaction to the reaction field or allowing a consecutive reaction to occur to control diffusion of the reaction product into the reaction field, for example.

The above three types of selectively permeable membrane type reactors have essentially the same configuration, although these selectively permeable membrane type reactors differ in types of catalyst and selectively permeable membrane or method of use (e.g. circulation method for reaction gas and product gas). Therefore, the configuration of the selectively permeable membrane type reactor according to the present invention may be applied to any of these selectively permeable membrane type reactors.

Preferred embodiments of the selectively permeable membrane type reactor according to the present invention are described below with reference to the drawings taking an extractor type reactor as an example. Note that the selectively permeable membrane type reactor according to the present invention is not limited to the following embodiments (extractor type reactor). The selectively permeable membrane type reactor according to the present invention may also be similarly applied to a distributor type reactor and a contactor type reactor.

The selectively permeable membrane type reactor according to the present invention includes, as essential elements, the catalyst 6, the selectively permeable membrane 8, and the carrier 22 for disposing the catalyst 6 and the selectively permeable membrane 8, as represented by the selectively permeable membrane type reactor 20 shown in FIGS. 2(a) and 2(b). The selectively permeable membrane type reactor according to the present invention is characterized by the structure of the carrier 22. Each element is described below.

(1) Carrier

The "carrier" used in the present invention is a member functioning as a support for disposing the catalyst 6 and the selectively permeable membrane 8, as represented by the carrier 22 of the selectively permeable membrane type reactor 20 shown in FIGS. 2(a) and 2(b), which is a tubular body having two or more gas passages (cells 26) partitioned and formed by the partition wall 24 formed of a porous body. The catalyst 6 and the selectively permeable membrane 8 can be disposed in the respective cells 26 by using the carrier 22 having such a structure. This effectively prevents a problem caused by the structure in which the catalyst and the selectively permeable membrane are disposed in the same space, which is employed in a known selectively permeable membrane type reactor. In more detail, a phenomenon can be effectively prevented in which a catalyst powder adheres to the selectively permeable membrane to clog the surface of the membrane or a catalyst powder reacts with the component of the selectively permeable membrane. In the present invention, the cell in which the catalyst is disposed is called a "reaction cell", and the cell in which the selectively permeable membrane is disposed is called a "recovery cell".

The partition wall 24 which partitions and forms the cells 26 of the carrier 22 is formed of a porous body. By forming the partition wall 24 using a porous body having gas permeability, a reaction product resulting from a chemical reaction promoted by the catalyst 6 can reach the recovery cell 38 in which the selectively permeable membrane 8 is disposed from the reaction cells 40 and 42 in which the catalyst 6 is disposed. Therefore, even if the catalyst 6 and the selectively permeable membrane 8 are disposed in the respective cells 26, a chemical reaction using the catalyst 6 and separation/recovery of the reaction product using the selectively permeable membrane 8 can take place at the same time.

The thickness of the partition wall 24 is not particularly limited. It is preferable that the partition wall 24 be formed as thin as possible from the viewpoint of closely disposing the catalyst 6 and the selectively permeable membrane 8. In a selectively permeable membrane type reactor, when the product gas travels a long distance before reaching the selectively permeable membrane and encounters a number of obstacles, it is difficult to effectively separate the target component using the selectively permeable membrane. Specifically, the efficiency of production and separation/recovery of the target component is decreased.

The thickness of the partition wall 24 is preferably 0.01 to 30 mm, still more preferably 0.05 to 15 mm, and particularly preferably 0.1 to 5 mm. If the thickness of the partition wall 24 is less than the lower limit of the above range, the partition wall may break due to low mechanical strength. If the thickness of the partition wall 24 exceeds upper limit of the above range, pressure loss is increased when the gas passes through the partition wall, whereby the gas passes through the partition wall to only a small extent. This may result in a decrease in the function of the selectively permeable membrane type reactor.

It is preferable to appropriately control the porosity and the average pore size of the porous body forming the partition wall 24 in order to allow the gas to reach the selectively permeable membrane 8 without encountering obstacles to a large extent while maintaining mechanical strength. The porosity of the porous body is preferably 20 to 60%, and still more preferably 30 to 50%.

It is also preferable to form the partition wall 24 on which the selectively permeable membrane 8 is disposed as a multilayer body including porous bodies with different average pore sizes. This configuration is advantageous in that the pressure loss occurring when the gas passes through the partition wall can be reduced while maintaining the mechanical strength. For example, two to five film-shaped porous bodies are stacked on a substrate with a relatively large average pore size so that the average pore size gradually decreases. In this case, the uppermost layer (layer in contact with the selectively permeable membrane) is called a surface layer, and the layer positioned between the surface layer and the substrate is called an intermediate layer.

The average pore size of the surface layer is preferably 0.001 to 10 μm, and still more preferably 0.01 to 1 μm in order to prevent occurrence of membrane defects. It is preferable that the intermediate layer and the substrate have an average pore size of 1 to 100 μm in order to maintain the mechanical strength.

If the porosity or the average pore size is less than the lower limit of the above range, the product gas may encounter a number of obstacles before reaching the selectively permeable membrane 8, whereby it may become difficult to effectively separate the target component using the selectively permeable membrane 8. If the porosity or the average pore size exceeds the upper limit of the above range, the mechanical strength necessary for the partition wall 24 may not be obtained.

Since a sintered metal or a ceramic sintered body is suitably used as the material for the porous body forming the partition wall 24, as described later, the porosity and the average pore size may be controlled as follows.

The porosity may be controlled by adjusting the raw material composition or the firing temperature when forming a sintered metal or a ceramic sintered body. For example, the porosity of the porous body may be reduced by reducing the ratio of the ceramic in the raw material to increase the ratio of the glass component, or by increasing the firing temperature. On the other hand, the porosity of the porous body may be increased by adding a pore-forming material such as graphite or starch to the raw material, or by decreasing the firing temperature.

The average pore size may be controlled by adjusting the average particle diameter of aggregate particles used as the raw material. For example, the average pore size of the porous body may be reduced by using aggregate particles with a small average particle diameter as the raw material. On the other hand, the average pore size of the porous body may be increased by using aggregate particles with a large average particle diameter as the raw material.

The "porosity" used herein refers to the porosity of the porous body measured using the Archimedes method before disposing the catalyst 6 and the selectively permeable membrane 8. The "average pore size" used herein is the pore size measured by mercury porosimetry using the following expression (1) as the principle expression, and refers to a pore size d calculated from a pressure P when the cumulative volume of mercury injected into the porous body has reached 50% of the total pore volume of the porous body (may be called "50% pore size ($d_{50}$)").

$$d = -\gamma \times \cos\theta / P \quad (1)$$

Where, d: pore size, γ: surface tension at liquid-air interface, θ: contact angle, P: pressure.

The material for the partition wall 24 is not particularly limited. A sintered metal or a ceramic sintered body is suitably used, since the entire carrier 22 including the partition wall 24 can be integrally formed by extrusion so that the carrier 22 can be relatively easily produced. In particular, a sintered metal formed of stainless steel (SS) or a heat-resistant alloy (e.g. INCONEL (registered trademark) or INCOLOY (registered trademark)), or a ceramic sintered body formed of alumina ($Al_2O_3$), titania ($TiO_2$), cordierite ($2MgO.2Al_2O_3.5SiO_2$), silicon carbide (SiC), silicon-infiltrated silicon carbide (Si—SiC), zirconia ($ZrO_2$), mullite ($3Al_2O_3.2SiO_2$), silicon nitride ($Si_3N_4$), or the like is suitably used due to excellent heat resistance and corrosion resistance.

The carrier 22 must be a tubular body having two or more cells 26 in order to dispose the catalyst 6 and the selectively permeable membrane 8 in respective cells 26. Note that the remaining configuration of the carrier 22 is not particularly limited insofar as this condition is satisfied. As the overall shape of the carrier, the carrier may be in the shape of a tubular body with a circular end face (cylindrical body), as represented by a carrier 52 of a selectively permeable membrane type reactor 50 shown in FIGS. 3(a) and 3(b), for example.

Figure 4:
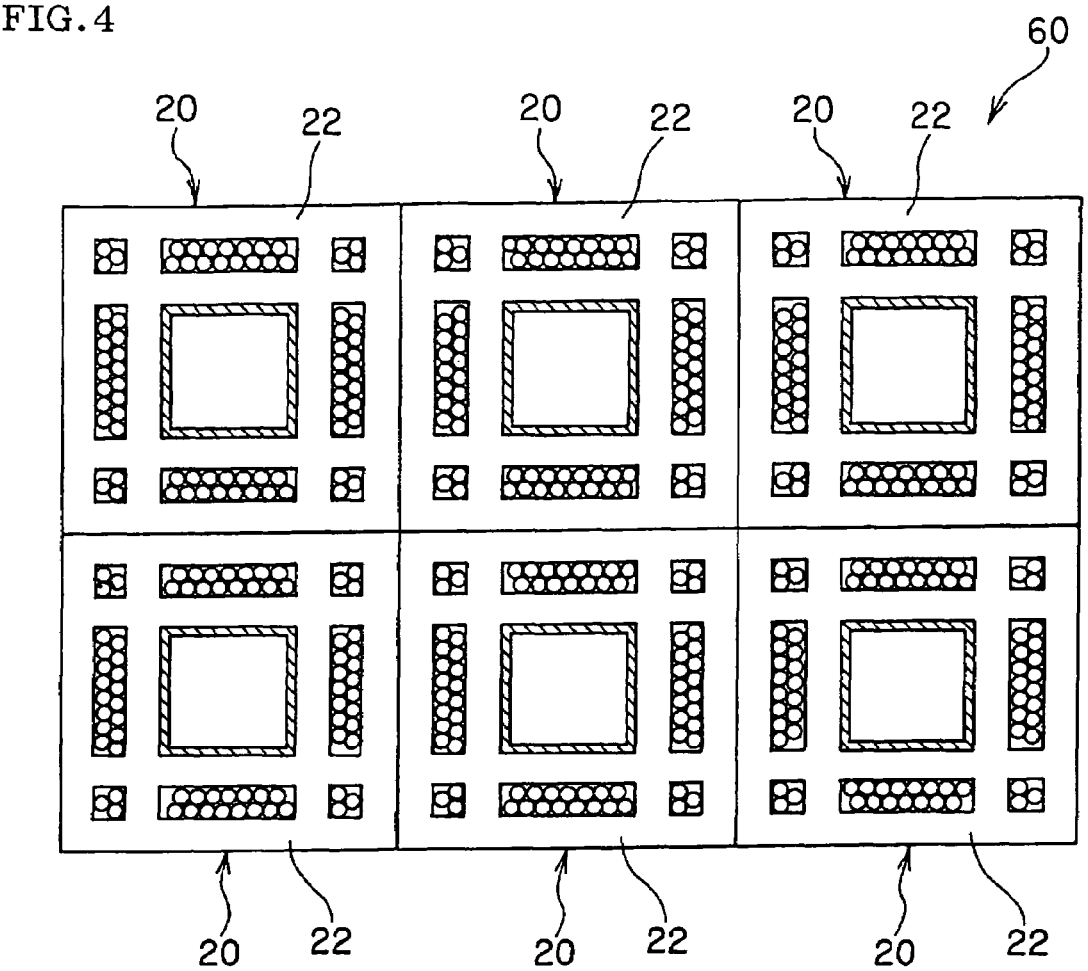
FIG. 4 is a schematic illustrative view of the selectively permeable membrane type reactor according to the present invention, showing an example in which a stacked structure is formed by integrating a number of carriers.

Note that a carrier in the shape of a tubular body with a square end face (rectangular parallelepiped), as represented by the carrier 22 of the selectively permeable membrane type reactor 20 shown in FIGS. 2(a) and 2(b), or a carrier in the shape of a tubular body with a rectangular or regular hexagonal end face (rectangular parallelepiped or regular hexagonal prism) is preferable when forming a module using a plurality of reactors. Such a configuration allows the carriers 22, that is, the selectively permeable membrane type reactors 20 to be easily integrated as shown in FIG. 4, whereby the selectively permeable membrane type reactors 20 can be compactly disposed. Specifically, when the carrier 22 of the selectively permeable membrane type reactor according to the present invention is in the shape of a tubular body with a square, rectangular, or regular hexagonal end face, it is also preferable that the selectively permeable membrane type reactors 20 be integrated to form a composite reactor 60.

In the present invention, it is necessary to adjacently dispose the cell (reaction cell) in which the catalyst is disposed and the cell (recovery cell) in which the selectively permeable membrane is disposed in order to closely position the catalyst and the selectively permeable membrane.

The carrier may be configured in various ways so that the above-described arrangement can be achieved. For example, a structure shown in FIGS. 2(a) and 2(b) may be suitably used which includes one center cell 28 disposed to include the center axis of the carrier and two or more peripheral cells 30 and 32 disposed adjacent to the center cell 28 on the periphery of the center cell 28.

This structure allows the reaction cell and the recovery cell to be adjacently disposed by disposing the catalyst 6 in either the center cell 28 or the peripheral cells 30 and 32 and disposing the selectively permeable membrane 8 in the another. In particular, a structure is preferable in which the reaction cells 40 and 42 and the recovery cells 38 are adjacently disposed by disposing the catalyst 6 in the peripheral cells 32 (reaction cells 40 and 42) and disposing the selectively permeable membrane 8 in the center cell 28 (recovery cell 38), as represented by the selectively permeable membrane type reactor 20 shown in FIGS. 2(a) and 2(b), since heat can be efficiently supplied to the catalyst 6 disposed in the peripheral cells 32. This structure may be particularly suitably used when carrying out an endothermic reaction which requires heat be supplied to the reaction cells 40 and 42 in which the catalyst 6 is disposed.

(2) Catalyst

The "catalyst" used in the present invention is a component for promoting a chemical reaction, and differs in type depending on the desired reaction. For example, when carrying out a reaction for producing hydrogen by reforming a hydrocarbon using steam and carbon dioxide, a nickel based catalyst, a noble metal based catalyst such as a platinum (Pt) based catalyst, ruthenium based catalyst, or rhodium (Rh) based catalyst, or the like may be suitably used. A noble metal based catalyst such as a platinum based catalyst may be suitably used for partial oxidation of a hydrocarbon, and a copper-zinc (Cu—Zn) based catalyst or an iron-chromium (Fe—Cr) based catalyst may be suitably used for a shift reaction of carbon monoxide (CO).

The shape of the catalyst is not particularly limited. A pellet-shaped catalyst as represented by the catalyst 6 shown in FIGS. 2(a) and 2(b) or a bead-shaped catalyst is suitably used, since a commercially-available catalyst can be utilized in case of this type of the catalysts. A catalyst supported on a catalyst carrier in advance may also be used. For example, a catalyst obtained by causing a catalyst to be supported on a catalyst carrier formed of a heat-resistant inorganic oxide with a large specific surface area (e.g. alumina, titania, or zirconia) in a highly dispersed state is preferably used. This configuration is advantageous in that the catalytically active component can be disposed in a highly dispersed state.

The configuration for disposing the catalyst 6 is not particularly limited. As shown in FIGS. 2(a) and 2(b), a pellet-shaped (or bead-shaped) catalyst may be used as the catalyst 6 in the same manner as in a known selectively permeable membrane type reactor, and the catalyst 6 may be disposed on the carrier 22 by filling the cells 26 of the carrier 22 with the catalyst 6 in a packed bed manner, for example. The "pellet-shaped or bead-shaped catalyst" used in the present invention also includes a catalyst supported on a pellet-shaped or bead-shaped catalyst carrier.

When filling the cell with the catalyst in a packed bed manner, it is important to determine the size of the bead or the pellet sufficiently taking the cross-sectional area and the length of the reaction cell into consideration. This aims at preventing a decrease in the reaction efficiency occurring when the reaction gas blows through the cell. In more detail, it is preferable that the ratio of the length of the reaction cell to the size of the pellet or bead be 10 to 30 or more, and the ratio of the diameter of the reaction cell to the size of the pellet or bead be 4 to 20 or more.

Figure 5A:
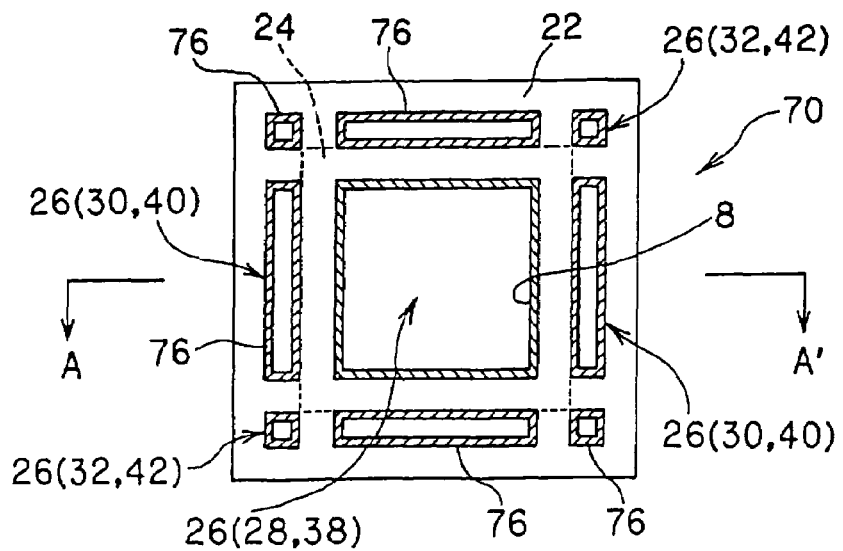
FIG. 5(a) is a schematic top view showing yet another embodiment of the selectively permeable membrane type reactor according to the present invention.
Figure 5B:
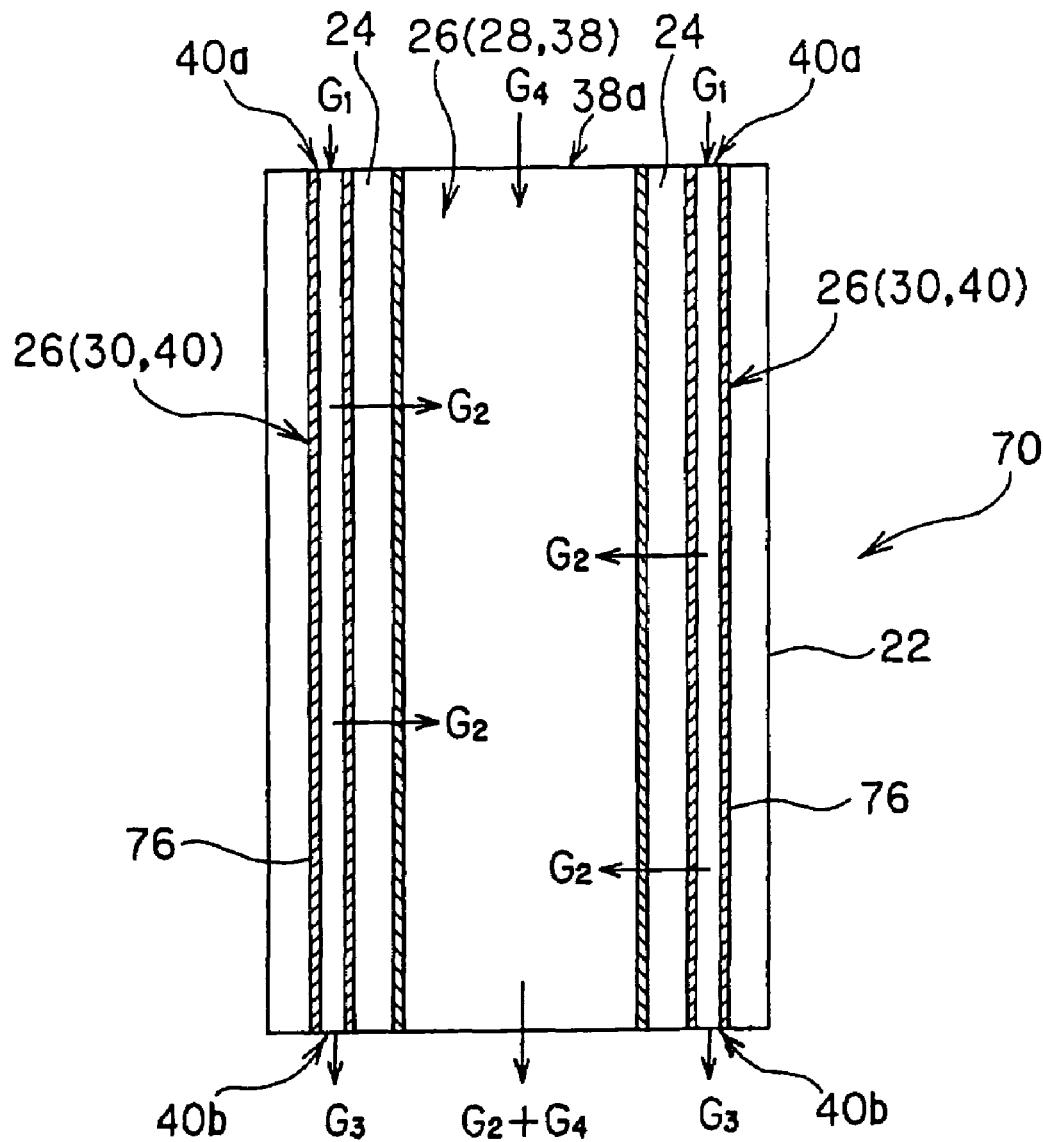
FIG. 5(b) is a cross-sectional view along the line A-A' shown in FIG. 5(a).

As represented by a selectively permeable membrane type reactor 70 shown in FIGS. 5(a) and 5(b), a catalyst 76 in the shape of a thin film may be used as the catalyst, and the catalyst 76 may be disposed on the carrier 22 by forming the catalyst 76 in the shape of a thin film to cover the surface of the partition wall 24 which partitions and forms the cell 26 of the carrier 22. This configuration allows the catalyst 76 to be generally disposed close to the selectively permeable membrane 8 to reduce the distance the product gas travels before reaching the selectively permeable membrane 8, and prevents other catalysts from hindering the movement of the product gas, whereby the target component can be effectively separated using the selectively permeable membrane 8. Therefore, a catalytic reaction and selective permeation of a specific component using the selectively permeable membrane can be achieved with a higher efficiency.

In the configuration shown in FIGS. 5(a) and 5(b), a decrease in the reaction efficiency occurring when the reaction gas blows through the cell can be prevented by appropriately setting the size of the space of the reaction cell (cross-sectional area in the direction perpendicular to the gas flow; the length of the space in the diametrical direction when the cell is cylindrical) and the length of the reaction cell.

The size of the space of the reaction cell is preferably 25 μm to 15 mm, although the size varies depending on the length of the reaction cell. If the size of the space is less than 25 μm, the pressure loss inside the reaction cell may be increased to a large extent, whereby circulation of the reaction gas may be hindered. If the size of the space is more than 15 mm, a decrease in the reaction efficiency occurring when the reaction gas blows through the reaction cell may not be prevented. The length of the reaction cell in the gas flow direction is preferably 1 cm to 5 m which is equal to that of a known reactor. If the length of the reaction cell is less than 1 cm, the reaction gas may blow through the reaction cell, whereby the amount of unreacted gas may be increased. If the length of the reaction cell is more than 5 m, it may be difficult to produce the membrane and the substrate using a known manufacturing technology. When filling the reaction cell with the catalyst in a packed bed manner, the inner diameter of the reaction cell is not particularly limited insofar as the ratio of the length of the reaction cell to the size of the pellet or bead and the ratio of the diameter of the reaction cell to the size of the pellet or bead are within the above-mentioned ranges.

The selectively permeable membrane type reactor 70 shown in FIGS. 5(a) and 5(b) has an advantage in that the reactor can be easily handled since the catalyst 76 is integrated with the carrier 22. Specifically, the carrier 22 can be prevented from breaking when installing the selectively permeable membrane type reactor 70 by connecting the selectively permeable membrane type reactor 70 to a raw material gas introduction mechanism, product gas removal mechanism, and the like, or when disposing the catalyst 76 on the carrier 22.

On the other hand, when filling the cell 26 of the carrier 22 with the bead-shaped or pellet-shaped catalyst 6 in a packed bed manner, as represented by the selectively permeable membrane type reactor 20 shown in FIGS. 2(a) and 2(b), since the product gas produced on the catalyst provided at a position relatively apart from the selectively permeable membrane 8 travels a long distance before reaching the selectively permeable membrane 8 and is hindered by other catalysts 6, whereby it may become difficult to effectively separate the target component using the selectively permeable membrane 8. Moreover, the carrier 22 may break when filling the cell 26 of the carrier 22 with the bead-shaped or pellet-shaped catalyst 6.

As the method of disposing a catalyst in the shape of a thin film, a method of forming a catalyst in the shape of a thin film by wash coating or the like using a slurry containing a catalyst powder so that the surface of the partition wall which partitions and forms the cells of the carrier is covered. In this case, the catalyst may be disposed not only on the surface of the porous body forming the partition wall, but also inside the pores of the porous body. This method is preferable in that the amount of catalyst supported on the carrier can be increased. Note that the catalyst is supported inside the pores of the porous body in such a range that the function of the selectively permeable membrane type reactor is not decreased due to clogging or a reduction in size of the pores.

(3) Selectively Permeable Membrane

The "selectively permeable membrane" used in the present invention is a member in the shape of a thin film which selectively allows a specific component to pass therethrough, and differs in type depending on the target component which is allowed to pass through the selectively permeable membrane. For example, when selectively separating/recovering hydrogen from a product gas obtained by reforming a hydrocarbon, a hydrogen permeable membrane formed of palladium (Pd) or a palladium alloy such as a palladium-silver alloy, which selectively allows hydrogen to pass therethrough, may be used. A hydrogen permeable membrane formed of silica or zirconia, a zeolite membrane, a nano membrane, or the like may also be used as the selectively permeable membrane. The method of forming the selectively permeable membrane is not particularly limited insofar as the selectively permeable membrane can be provided with a specific permeability. For example, a known membrane formation method such as plating, chemical vapor deposition (CVD), sputtering, or sol coating may be used.

The configuration for disposing the selectively permeable membrane is not particularly limited. As shown in FIGS. 2(a) and 2(b), it is preferable to dispose the selectively permeable membrane 8 on the carrier 22 by forming the selectively permeable membrane 8 in the shape of a thin film to cover the surface of the partition wall 24 which partitions and forms the cells 26 of the carrier 22. In this case, it is necessary to prevent the product gas from leaking from the reactions cells 40 and 42 into the recovery cell 38 by closely covering the surface of the partition wall 24 which partitions and forms the cells 26 of the carrier 22.

(4) Method of Use

A method of using the selectively permeable membrane type reactor according to the present invention is described below taking an example of producing hydrogen by reforming methane and separating/recovering the produced hydrogen using the selectively permeable membrane type reactor 20 shown in FIGS. 2(a) and 2(b). In this case, a selectively permeable membrane type reactor 20 may be used in which a nickel based reforming catalyst which promotes a reforming reaction of methane is disposed as the catalyst 6 and a hydrogen permeable membrane formed of a palladium-silver alloy which selectively allows hydrogen to pass therethrough is disposed as the selectively permeable membrane 8.

The raw material gas $G_1$ including methane, steam, and the like is introduced through a gas inlet 40a of the reaction cell 40 and a gas inlet (not shown) of the reaction cell 42 at a high temperature of about 300 to 1000° C. In the selectively permeable membrane type reactor 20, one end of the recovery cell 38 is closed by a plug 34 formed of a dense alumina body so that the raw material gas $G_1$ is introduced into only the reaction cells 40 and 42 without being introduced into the recovery cell 38.

The raw material gas $G_1$ introduced into the reaction cells 40 and 42 contacts the catalyst 6, whereby a reforming reaction shown by the following formula (1) and a shift reaction shown by the following formula (2) are promoted. This allows the methane in the raw material gas $G_1$ to be decomposed into reaction products such as hydrogen, carbon monoxide, and carbon dioxide, whereby a mixed gas (product gas) containing these reaction products is obtained.

$$CH_4 + H_2O \leftrightarrows CO + 3H_2 \qquad (1)$$

$$CO + H_2O \leftrightarrows CO_2 + H_2 \qquad (2)$$

The hydrogen obtained as the product gas passes through the partition wall 24 formed of the porous body and the selectively permeable membrane 8 to enter the recovery cell 38, and is separated/recovered as the permeable gas $G_2$ through a gas recovery port 38b of the recovery cell 38. On the other hand, since the remaining components (e.g. carbon monoxide and carbon dioxide as the reaction products and unreacted raw material gas) cannot pass through the selectively permeable membrane 8, these components pass through the reaction cell 40 and are recovered as the impermeable gas $G_3$ through a gas recovery port 40b of the reaction cell 40 and a gas inlet port (not shown) of the reaction cell 42. This mechanism allows the permeable gas $G_2$ and the impermeable gas $G_3$ to be separated and individually recovered. Therefore, only the target component (hydrogen in this example) can be selectively separated/recovered from the reaction products of the reforming reaction.

It is preferable to use the selectively permeable membrane type reactor according to the present invention in a state in which the partial pressure of the target component is reduced in the recovery cell. In more detail, the partial pressure of the target component may be reduced by causing a sweep gas such as steam to flow through the recovery cell or by reducing the pressure inside the recovery cell in comparison with the reaction cell using a vacuum pump, for example. This method of use is preferable since the difference in partial pressure between the reaction cell and the recovery cell can be increased, whereby the permeability can be improved when the target component passes through the selectively permeable membrane.

As a representative example of the application of the selectively permeable membrane type reactor according to the present invention, production of hydrogen by reforming a hydrocarbon and separation/recovery of the produced hydrogen using a hydrogen permeable membrane as the selectively permeable membrane can be given. Note that the application of the selectively permeable membrane type reactor according to the present invention is not limited thereto. For example, the selectively permeable membrane type reactor according to the present invention may also be used for various reactions such as isomerization of p-xylene and separation/recovery thereof by combining a silica-alumina based isomerization catalyst and a zeolite membrane which selectively allows p-xylene to pass therethrough, dehydrogenation of cyclohexane or decalin by combining a noble metal based dehydrogenation catalyst and a hydrogen permeable membrane, or hydrogenation of toluene, benzene, or 1-butene by combining a noble metal based hydrogenation catalyst and a hydrogen permeable membrane.

EXAMPLES

The selectively permeable membrane type reactor according to the present invention is described below in detail by way of examples. Note that the selectively permeable membrane type reactor according to the present invention is not limited to the following examples.

Example 1

The selectively permeable membrane type reactor 20 shown in FIGS. 2(a) and 2(b) including the catalyst 6, the selectively permeable membrane 8, and the carrier 22 was produced.

As the carrier 22, a tubular body having two or more gas passages (cells 26) partitioned and formed by the partition wall 24 formed of a porous body was used. In more detail, the carrier 22 in the shape of a tubular body (rectangular parallelepiped) with a square end face with dimensions of 6×6 cm and a height of 30 cm was used, the carrier 22 having one center cell 28 (cell shape: square with dimensions of 4×4 cm) disposed to include the center axis of the carrier 22 and eight peripheral cells 30 (cell shape: rectangle with dimensions of 4×0.4 cm) and 32 (cell shape: square with dimensions of 0.4×0.4 cm) disposed adjacent to the center cell 28 on the periphery of the center cell 28.

The carrier 22 was a multilayer film including a substrate formed of an alumina porous body with an average pore size of 5 μm and a porosity of 38%, an intermediate layer (alumina porous body with an average pore size of 0.5 μm and a porosity of 41%) formed only on the surface of the partition wall of the substrate forming the inner circumferential surface of the center cell, and a surface layer (alumina porous body with an average pore size of 0.1 μm and a porosity of 33%). The total thickness of the partition wall (i.e. substrate, intermediate layer, and surface layer) of the carrier 22 was 3 mm.

The carrier 22 was formed as follows. Alumina clay was extruded to obtain a formed product, and the formed product was dried and fired to obtain a substrate. An alumina slurry was formed on the substrate to obtain a formed body, and the operation of drying and firing the formed body was performed twice to obtain a multilayer film including the intermediate layer and the surface layer.

The catalyst 6 was disposed in the peripheral cells 30 and 32 of the nine cells 26 of the carrier 22, and the selectively permeable membrane 8 was disposed in the center cell 28. Specifically, the peripheral cells 30 and 32 were provided as the reaction cells 40 and 42 in which the catalyst 6 was disposed, and the center cell 28 was provided as the recovery cell 38 in which the selectively permeable membrane 8 was disposed. The end of the recovery cell 38 on the side of the gas inlet 40a of the reaction cell 40 was closed by the plug 34 formed of a dense alumina body.

As the catalyst 6, a nickel based catalyst formed in the shape of pellets with an outer diameter of about 0.5 mm was used. The catalyst 6 was disposed in the carrier 22 by filling the peripheral cells 30 and 32 of the carrier 22 with the catalyst 6 in a packed bed manner.

As the selectively permeable membrane 8, a hydrogen permeable membrane formed of a palladium-silver alloy and having a shape of a thin film with an average thickness of 3 μm was used. The selectively permeable membrane 8 was formed to cover the surface of the partition wall 24 (surface of the surface layer of the multilayer film) by which the center cell 28 of the carrier 22 was partitioned and formed to dispose the selectively permeable membrane 8 on the carrier 22. The composition of the palladium-silver alloy was set so that palladium was 80 wt % and silver was 20 wt % taking hydrogen permeability into consideration. The hydrogen permeable membrane was formed by metal plating.

Example 2

Figure 3A:
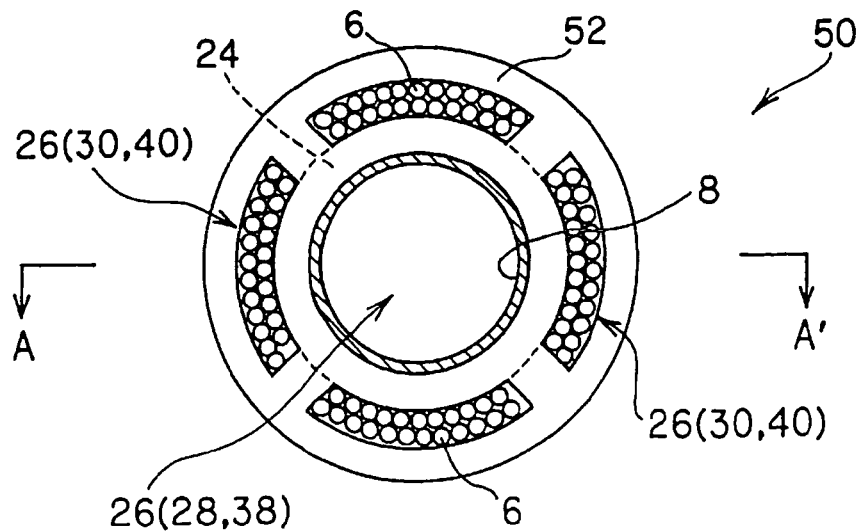
FIG. 3(a) is a schematic top view showing another embodiment of the selectively permeable membrane type reactor according to the present invention.
Figure 3B:
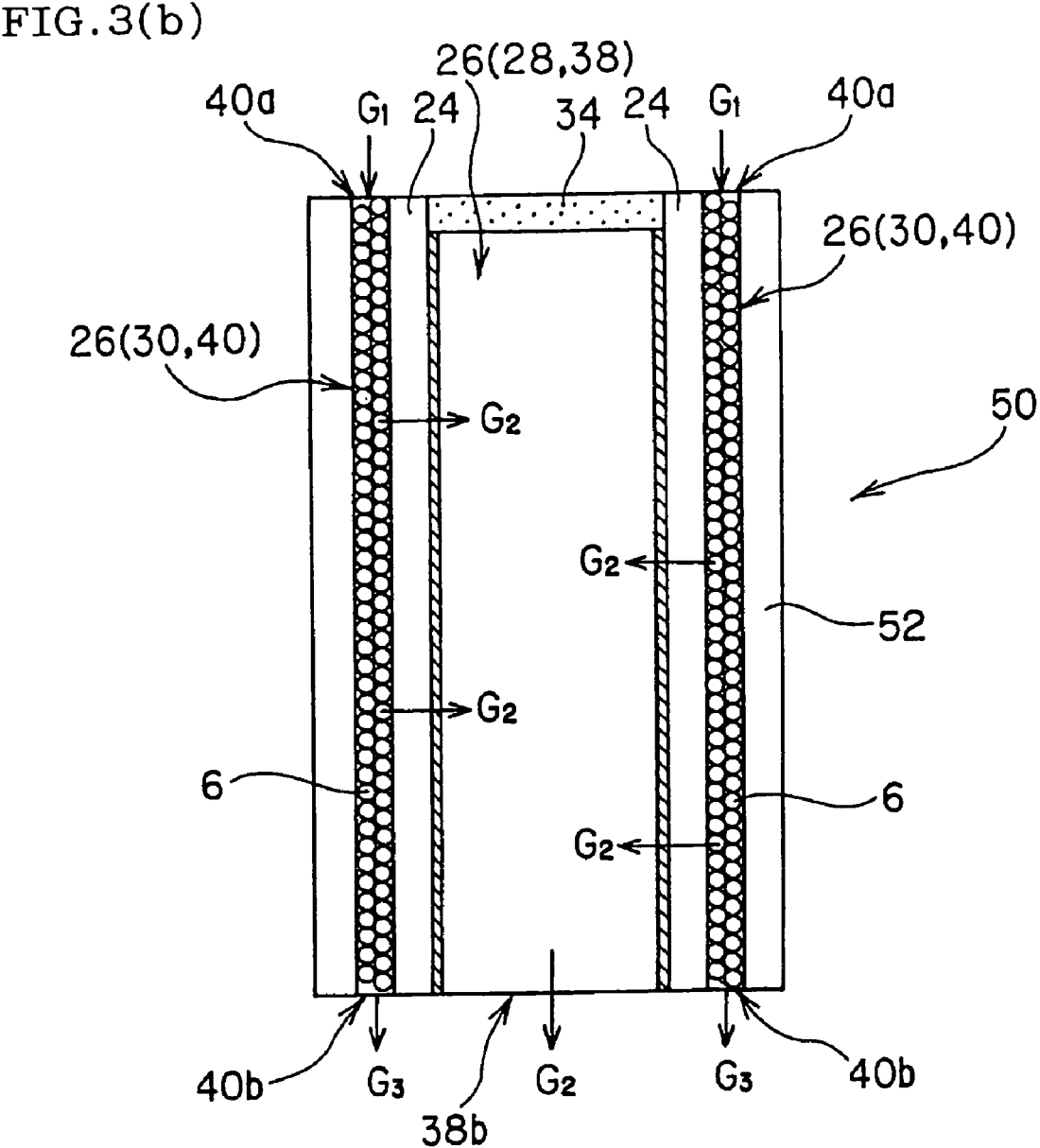
FIG. 3(b) is a cross-sectional view along the line A-A' shown in FIG. 3(a).

The selectively permeable membrane type reactor 50 shown in FIGS. 3(a) and 3(b) including the catalyst 6, the selectively permeable membrane 8, and the carrier 52 was produced.

As the carrier 52, a tubular body having two or more gas passages (cells 26) partitioned and formed by the partition wall 24 formed of a porous body was used. In more detail, the carrier 52 in the shape of a tubular body (cylinder) with a circular end face with a diameter of 7 cm and a height of 30 cm was used, the carrier 52 having one center cell 28 (cell shape: circle with a diameter of 3 cm) disposed to include the center axis of the carrier 52 and four peripheral cells 30 (cell shape: fan-shaped cells obtained by dividing the carrier 52 into four sections at 90° at a width of 1 cm) disposed adjacent to the center cell 28 on the periphery of the center cell 28.

The carrier 52 was a multilayer film including a substrate formed of an alumina porous body with an average pore size of 2 μm and a porosity of 45%, an intermediate layer (alumina porous body with an average pore size of 0.7 μm and a porosity of 37%) formed only on the surface of the partition wall of the substrate forming the inner circumferential surface of the center cell, and a surface layer (alumina porous body with an average pore size of 0.06 μm and a porosity of 41%). The thickness of the partition wall of the carrier 52 was 5 mm. The carrier 52 was produced in the same manner as the carrier used in Example 1.

The catalyst 6 was disposed in the peripheral cells 30 of the five cells 26 of the carrier 52, and the selectively permeable membrane 8 was disposed in the center cell 28. Specifically, the peripheral cells 30 were provided as the reaction cells 40 in which the catalyst 6 was disposed, and the center cell 28 was provided as the recovery cell 38 in which the selectively permeable membrane 8 was disposed. The end of the recovery cell 38 on the side of the gas inlet 40a of the reaction cell 40 was closed by the plug 34 formed of a dense alumina body.

As the catalyst 6, a nickel based reforming catalyst formed in the shape of pellets with an outer diameter of about 1.3 mm was used. The catalyst 6 was disposed in the carrier 52 by filling the peripheral cells 30 of the carrier 52 with the catalyst 6 in a packed bed manner.

As the selectively permeable membrane 8, a hydrogen permeable membrane formed of a palladium-silver alloy and having a shape of a thin film with an average thickness of 2.2 μm was used. The selectively permeable membrane 8 was formed to cover the surface of the partition wall 24 (surface of the surface layer of the multilayer film) by which the center cell 28 of the carrier 52 was partitioned and formed to dispose the selectively permeable membrane 8 in the carrier 52. The composition of the palladium-silver alloy was set so that palladium was 70 wt % and silver was 30 wt % taking hydrogen permeability into consideration. The hydrogen permeable membrane was formed by metal plating.

Example 3

The selectively permeable membrane type reactor 70 shown in FIGS. 5(*a*) and 5(*b*) including the catalyst 76 in the shape of a thin film, the selectively permeable membrane 8, and the carrier 22 was produced.

As the carrier 22, a carrier having a structure similar to that of the carrier used in Example 1 and produced in the same manner as the carrier used in Example 1 was used.

The catalyst 76 was disposed in the peripheral cells 30 and 32 of the nine cells 26 of the carrier 22, and the selectively permeable membrane 8 was disposed in the center cell 28. Specifically, the peripheral cells 30 and 32 were provided as the reaction cells 40 and 42 in which the catalyst 76 was disposed, and the center cell 28 was provided as the recovery cell 38 in which the selectively permeable membrane 8 was disposed. The end of the recovery cell 38 was not closed by the plug 34 formed of a dense alumina body so that a sweep gas $G_4$ could be introduced into the recovery cell 38, differing from the selectively permeable membrane type reactor 20 of Example 1.

As the catalyst 76, a ruthenium based reforming catalyst was used. The catalyst 76 was disposed in the carrier 22 by forming the catalyst in the shape of a thin film by wash coating using a slurry containing the catalyst powder so that the surface of the partition wall 24 by which the peripheral cells 30 and 32 of the carrier 22 were partitioned and formed was covered. As the selectively permeable membrane 8, a selectively permeable membrane having a structure similar to that of the selectively permeable membrane used in Example 1 was used. The selectively permeable membrane 8 was disposed on the carrier 22 in the same manner as the selectively permeable membrane used in Example 1.

Comparative Example 1

The selectively permeable membrane type reactor 10 shown in FIG. 1 including the catalyst 6, the selectively permeable membrane 8, the reaction tube 2, and the separation tube 4 was produced.

As the reaction tube 2, a cylindrical reaction tube (inner diameter: 4 cm, outer diameter: 5 cm, height: 40 cm) made of stainless steel (SS) with a thickness of 5 mm and having a heat resistance of 300 to 1000° C. was used. The separation tube 4 was a cylindrical separation tube with a bottom (inner diameter: 0.8 cm, outer diameter: 1 cm, height: 20 cm) having an outermost surface layer formed of an alumina porous body with an average pore size of 0.07 μm and a porosity of 41% (intermediate layer: average pore size: 0.7 μm, porosity 39%; substrate: average pore size: 2.5 μm, porosity: 45%). The separation tube 4 was disposed inside the reaction tube 2 to form a double tube structure.

The catalyst 6 was disposed in the space between the reaction tube 2 and the separation tube 4, and the selectively permeable membrane 8 was disposed on the outer surface of the separation tube 4.

As the catalyst 6, a nickel based catalyst formed in the shape of pellets with an outer diameter of about 2 mm was used. The catalyst 6 was disposed by filling the space between the reaction tube 2 and the separation tube 4 with the catalyst 6 in a packed bed manner.

As the selectively permeable membrane 8, a hydrogen permeable membrane formed of a palladium-silver alloy and having a shape of a thin film with an average thickness of 3 μm was used. The selectively permeable membrane 8 was formed to cover the outer surface of the separation tube 4 to dispose the selectively permeable membrane 8 in the separation tube 4. The composition of the palladium-silver alloy was set so that palladium was 80 wt % and silver was 20 wt % taking hydrogen permeability into consideration. The hydrogen permeable membrane was formed by metal plating.

(Evaluation)

The selectively permeable membrane type reactors of Examples 1 to 3 and Comparative Example 1 were evaluated in a state in which the selectively permeable membrane type reactor was placed in a housing made of stainless steel. The housing was configured so that a permeable gas passage and an impermeable gas passage, which were airtightly isolated, were formed therein and a permeable gas and an impermeable gas obtained by the selectively permeable membrane type reactor were separated and individually recovered.

Figure 6:
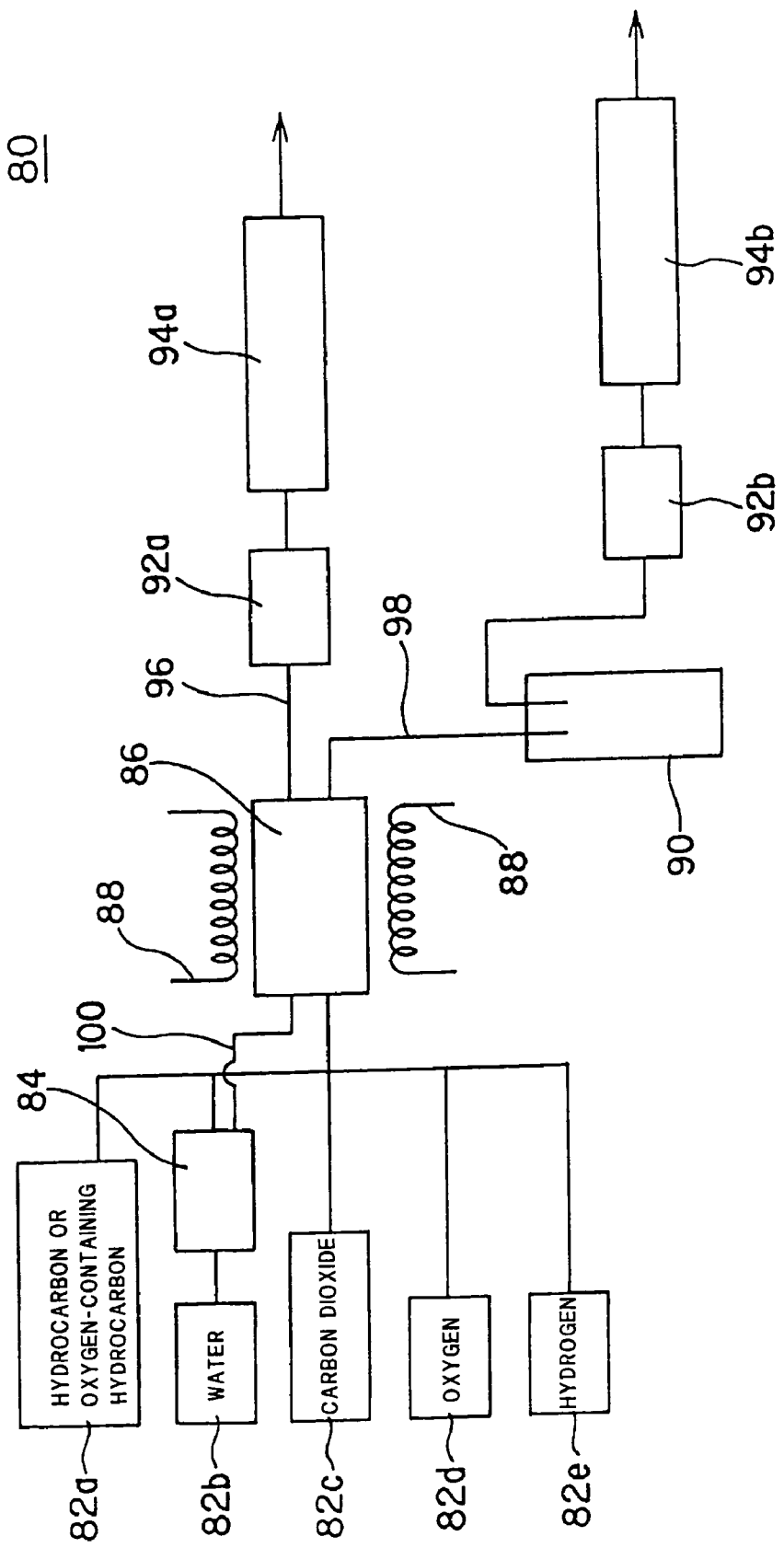
FIG. 6 is a block diagram showing a configuration of an evaluation device used in the examples.

The selectively permeable membrane type reactor was evaluated according to the following method using an evaluation device 80 shown in FIG. 6 including raw material gas supply sources 82*a* to 82*d* for supplying raw material gases such as a hydrocarbon such as methane or butane, an oxygen-containing hydrocarbon such as methanol, water, carbon dioxide, and oxygen, a hydrogen supply source 82*e* for supplying hydrogen for reducing a nickel based catalyst, a vaporizer 84 for vaporizing water to produce steam, a selectively permeable membrane type reactor 86, a heater 88 for heating the selectively permeable membrane type reactor 86, a liquid trap 90 for trapping a liquid component such as water, flowmeters 92*a* and 92*b* for measuring the amount of gas, and gas chromatographs 94*a* and 94*b* for measuring the gas component.

The oxidized nickel based catalyst was reduced at a high temperature of about 400° C. by supplying hydrogen from the hydrogen supply source 82*e*. The raw material gases such as the hydrocarbon or the oxygen-containing hydrocarbon, steam, carbon dioxide, and oxygen supplied from the raw material gas supply sources 82*a* to 82*d* were mixed at a specified ratio and introduced into the selectively permeable membrane type reactor 86 to promote the reforming reaction and the shift reaction using the catalyst. In the selectively permeable membrane type reactor of Example 3, the reaction was carried out while introducing the sweep gas $G_4$ into the recovery cell 38 from the gas inlet 38*a* of the recovery cell 38 through the sweep gas supply line 100.

Among hydrogen, carbon monoxide, carbon dioxide, steam, and the like produced by the reaction and unreacted components, only the hydrogen as the target component was allowed to pass through the selectively permeable membrane (hydrogen permeable membrane) as a permeable gas and supplied to the gas chromatograph 94*a* through the flowmeter 92*a* and the permeable gas recovery line 96 to quantitatively determine the gas components. An impermeable gas containing other components was supplied to the impermeable gas recovery line 98. After removing the liquid components such as water using the liquid trap 90, the residual gas was supplied to the gas chromatograph 94*b* through the flowmeter 92*b* to quantitatively determine the gas components.

The hydrocarbon was subjected to steam reforming using the evaluation device 80 under various reaction conditions to produce hydrogen and separate/recover the produced hydrogen. The reaction temperature was set at 550° C., the steam/carbon ratio (ratio of the number of moles of water to the number of moles of carbon ("1" for methane and "4" for butane)) was set at "3", the pressure inside the reaction cell was set at 506 kPa (5 atm), and the partial pressure of hydrogen in the recovery cell was set at 10 kPa (0.1 atm). The "hydrogen recovery rate" was calculated using the following expression (1), and the "hydrogen production efficiency" was calculated using the following expression (2). The results are shown in Table 1.

$$Rc = 100 \times Qp/(Qp + Qr \times C_H) \quad (1)$$

Where, Rc: hydrogen recovery rate (%), Qp: recovery cell outlet gas flow (unit: L/min, for example), Qr: reaction cell outlet gas flow (unit:. L/min, for example), $C_H$: molar fraction of hydrogen gas in reaction cell outlet gas.

$$Rp = (Cm \times Rc) \div 100 \quad (2)$$

Where, Rp: hydrogen production efficiency (%), Cm: methane conversion rate (%), Rc: hydrogen recovery rate (%)

TABLE 1

|  | Hydrogen recovery rate (%) | Methane conversion rate (%) | Hydrogen production efficiency (%) |
| --- | --- | --- | --- |
| Example 1 | 61 | 71 | 43 |
| Example 2 | 62 | 73 | 45 |
| Example 3 | 59 | 70 | 41 |
| Comp. Exam. 1 | 58 | 68 | 39 |

As shown in Table 1, the hydrogen production efficiency when using the selectively permeable membrane type reactors of Examples 1 to 3 was higher in an amount of 2 to 6 points than that when using the selectively permeable membrane type reactor of Comparative Example 1. These results suggest that the selectively permeable membrane type reactors of Examples 1 to 3 could produce hydrogen and separate/recover the produced hydrogen as the target component with an efficiency higher than that of the selectively permeable membrane type reactor of Comparative Example 1.

The surface of the selectively permeable membrane was observed using a scanning electron microscope after continuously operating the selectively permeable membrane type reactors of Examples 1 to 3 and the selectively permeable membrane type reactor of Comparative Example 1 for one hundred hours. As a result, a powder of the nickel based catalyst or the ruthenium based catalyst did not adhere to the surface of the selectively permeable membrane in the selectively permeable membrane type reactors of Examples 1 to 3. On the other hand, a large amount of powder of the nickel based catalyst produced by wear or the like adhered to the surface of the selectively permeable membrane in the selectively permeable membrane type reactor of Comparative Example 1. It was confirmed that the selectively permeable membrane deteriorated due to the reaction between the catalyst powder and the selectively permeable membrane.

From these results, it was presumed that the selectively permeable membrane type reactors of Examples 1 to 3 could produce hydrogen as the target component and separate/recover the produced hydrogen with high efficiency due to the suppression of deterioration of the selectively permeable membrane by preventing adhesion of the catalyst powder to the surface of the selectively permeable membrane.

INDUSTRIAL APPLICABILITY

The selectively permeable membrane type reactor according to the present invention may be suitably used when simultaneously effecting catalytic reaction promotion and selective permeation of a specific component using the selectively permeable membrane. Specifically, the selectively permeable membrane type reactor according to the present invention may be used for various applications such as production of hydrogen by reforming a hydrocarbon and separation/recovery of the produced hydrogen when using a reactor (e.g. extractor type reactor) which simultaneously effects a chemical reaction using the catalyst and separation/recovery of the reaction product using the selectively permeable membrane, oxidation of a hydrocarbon when using a reactor (distributor type reactor) which simultaneously effects a chemical reaction using the catalyst and prevention of a side reaction by concentration adjustment of a specific component using the selectively permeable membrane, or supplying an active species effective for a reaction or controlling diffusion of a reaction product into a reaction field when using a reactor (contactor type reactor) which effects a chemical reaction using the selectively permeable membrane as the catalyst.

The invention claimed is:

1. A selectively permeable membrane type reactor comprising a catalyst for promoting a chemical reaction, a selectively permeable membrane which selectively allows a specific component to pass therethrough, and a carrier for disposing the catalyst and the selectively permeable membrane, the carrier being a tubular body having two or more gas passage cells partitioned and formed by a partition wall formed of a porous body, the catalyst being individually disposed in some of the cells, the selectively permeable membrane being individually disposed in the remainder of the cells, the cell in which the catalyst is disposed and the cell in which the selectively permeable membrane is disposed being adjacently disposed, the carrier including one center cell disposed to include a center axis of the carrier and two or more peripheral cells disposed adjacent to the center cell on a periphery of the center cell, the catalyst being disposed in either the center cell or the peripheral cells, and the selectively permeable membrane being disposed in the other.

2. The selectively permeable membrane type reactor according to claim 1, wherein the carrier includes the cells partitioned and formed by the partition wall with a thickness of 10 μm to 3 cm.

3. The selectively permeable membrane type reactor according to claim 1, wherein the catalyst is a pellet-shaped or bead-shaped catalyst, and is disposed in the carrier by filling the cell of the carrier with the pellet-shaped or bead-shaped catalyst in a packed bed manner.

4. The selectively permeable membrane type reactor according to claim 1, wherein the catalyst is in the shape of a thin film and is disposed in the carrier by forming the catalyst in the shape of a thin film on a surface of the partition wall which partitions and forms the cells of the carrier.

5. The selectively permeable membrane type reactor according to a claim 1, wherein the carrier is a tubular body with a square, rectangular, or regular hexagonal end face.

6. A selectively permeable membrane type reactor comprising a plurality of the selectively permeable membrane type reactors each of which comprises a catalyst for promoting a chemical reaction, a selectively permeable membrane which selectively allows a specific component to pass therethrough, and a carrier for disposing the catalyst and the selectively permeable membrane, the carrier being a tubular body having two or more gas passage cells partitioned and formed by a partition wall formed of a porous body, the catalyst being individually disposed in some of the cells, the selectively permeable membrane being individually disposed in the remainder of the cells, the cell in which the catalyst is disposed and the cell in which the selectively permeable membrane is disposed being adjacently disposed, the carrier including one center cell disposed to include a center axis of the carrier and two or more peripheral cells disposed adjacent to the center cell on a periphery of the center cell, the catalyst being disposed in either the center cell or the peripheral cells, and the selectively permeable membrane being disposed in the other, the selectively permeable membrane type reactors being integrated to form a composite reactor.

7. A selectively permeable membrane type reactor comprising a plurality of the selectively permeable membrane type reactors according to claim 6, wherein the carrier includes the cells partitioned and formed by the partition wall with a thickness of 10 μm to 3 cm.

8. A selectively permeable membrane type reactor comprising a plurality of the selectively permeable membrane type reactors according to claim 6, wherein the catalyst is a pellet-shaped or bead-shaped catalyst, and is disposed in the carrier by filling the cell of the carrier with the pellet-shaped or bead-shaped catalyst in a packed bed manner.

9. A selectively permeable membrane type reactor comprising a plurality of the selectively permeable membrane type reactors according to claim 6, wherein the catalyst is in the shape of a thin film and is disposed in the carrier by forming the catalyst in the shape of a thin film on a surface of the partition wall which partitions and forms the cells of the carrier.

10. The selectively permeable membrane type reactor according to claim 6, wherein the carrier is a tubular body with a square, rectangular, or regular hexagonal end face.

11. A selectively permeable membrane type reactor comprising:
- a tubular carrier having a plurality of gas passage cells extending therethrough, each cell being partitioned and formed by a porous partition wall, a first one of said cells being positioned along a center axis of the tubular carrier with at least two of said cells being positioned outwardly from but adjacent to said first cell;
- a catalyst for promoting a chemical reaction, said catalyst being disposed either in said first cell or in one of said two cells; and
- a selectively permeable membrane which selectively allows a specific component to pass therethrough, said membrane being disposed in at least one of said cells in which said catalyst is not disposed, such that said membrane and said catalyst are separated by said porous partition wall.

* * * * *